United States Patent
Du et al.

(10) Patent No.: US 10,403,017 B2
(45) Date of Patent: Sep. 3, 2019

(54) EFFICIENT IMAGE SYNTHESIS USING SOURCE IMAGE MATERIALS

(71) Applicant: Alibaba Group Holding Limited, George Town (KY)

(72) Inventors: Zhijun Du, Hangzhou (CN); Sanping Li, Hangzhou (CN); Nan Wang, Hangzhou (CN); Qiang He, Hangzhou (CN); Yanjun Zhao, Hangzhou (CN); Zhenqiang Lao, Hangzhou (CN); Jie Shi, Hangzhou (CN); Weixing Wang, Hangzhou (CN)

(73) Assignee: Alibaba Group Holding Limited, Shenzhen (CN)

( * ) Notice: Subject to any disclaimer, the term of this patent is extended or adjusted under 35 U.S.C. 154(b) by 0 days.

(21) Appl. No.: 15/716,381

(22) Filed: Sep. 26, 2017

(65) Prior Publication Data
US 2018/0018801 A1 Jan. 18, 2018

Related U.S. Application Data

(63) Continuation of application No. PCT/CN2016/076949, filed on Mar. 22, 2016.

(30) Foreign Application Priority Data

Mar. 30, 2015 (CN) .......................... 2015 1 0145112

(51) Int. Cl.
*G09G 5/00* (2006.01)
*G06T 11/60* (2006.01)
(Continued)

(52) U.S. Cl.
CPC ............ *G06T 11/60* (2013.01); *G06F 17/212* (2013.01); *G06F 17/2247* (2013.01);
(Continued)

(58) Field of Classification Search
CPC ............... G06F 17/212; G06F 17/2247; G06F 17/2258; G06T 11/60; G06T 11/00; H04L 67/06; H04L 67/42
(Continued)

(56) References Cited

U.S. PATENT DOCUMENTS

2002/0122075 A1* 9/2002 Karasawa ............. G06F 3/0486
715/846
2009/0094534 A1* 4/2009 Murai .................. H04L 12/1827
715/753
(Continued)

FOREIGN PATENT DOCUMENTS

CN 102200995 9/2011
CN 102739561 10/2012
(Continued)

OTHER PUBLICATIONS

International Search Report of the International Searching Authority issued in International Application No. PCT/CN2016/076949 dated Jun. 27, 2016; 9 pages.
(Continued)

*Primary Examiner* — Scott T Baderman
*Assistant Examiner* — Hassan Mrabi
(74) *Attorney, Agent, or Firm* — Fish & Richardson P.C.

(57) ABSTRACT

A request is received for an image to be presented on a client computing device, where the image is synthesized by shared images and dedicated images dedicated to the client computing device. A first one or more source files are identified for generating the shared images that are used by the client computing device and one or more other client computing devices. The shared images are generated based on the first one or more source files. A second one or more source files are identified for generating the dedicated images. A configuration file is generated that includes instructions for the
(Continued)

client computing device to synthesize the shared images and the second one or more source files to the requested image. The shared images, the second one or more source files, and the configuration file are sent to the client computing device.

20 Claims, 9 Drawing Sheets

(51) Int. Cl.
*G06F 17/21* (2006.01)
*G06F 17/22* (2006.01)
*G06T 11/00* (2006.01)
*H04L 29/08* (2006.01)
*H04L 29/06* (2006.01)

(52) U.S. Cl.
CPC .......... *G06F 17/2258* (2013.01); *G06T 11/00* (2013.01); *H04L 67/06* (2013.01); *H04L 67/42* (2013.01)

(58) Field of Classification Search
USPC ......................................................... 715/203
See application file for complete search history.

(56) References Cited

U.S. PATENT DOCUMENTS

| | | | | |
|---|---|---|---|---|
| 2010/0104158 A1* | 4/2010 | Shechtman | ............... | G06K 9/46 382/131 |
| 2011/0239108 A1* | 9/2011 | Blomquist | .......... | G06F 17/3089 715/235 |
| 2012/0005475 A1* | 1/2012 | Inagaki | .................. | H04N 7/147 713/150 |
| 2012/0086095 A1* | 4/2012 | Nishiyama | ........ | H01L 27/14609 257/432 |
| 2012/0306931 A1* | 12/2012 | Fujinuki | ................ | G06F 3/1415 345/672 |
| 2013/0194305 A1* | 8/2013 | Kakuta | ................. | G06T 19/006 345/633 |

FOREIGN PATENT DOCUMENTS

| | | |
|---|---|---|
| CN | 103166945 | 6/2013 |
| CN | 103631630 | 3/2014 |
| CN | 103699652 | 4/2014 |
| CN | 104168417 | 11/2014 |
| EP | 3279866 | 2/2018 |
| JP | 2010066972 | 3/2010 |
| WO | 2014203837 | 12/2014 |

OTHER PUBLICATIONS

Extended European Search Report issued in EP Application No. 16771290.0 dated Aug. 3, 2018; 12 pages.
Michiaki Tatsubori et al. "HTML Templates that Fly"; International World Wide Web Conference; Apr. 20, 2009; 10 pages.

* cited by examiner

EFFICIENT IMAGE SYNTHESIS USING SOURCE IMAGE MATERIALS

This application is a continuation of PCT Application No. PCT/CN2016/076949 filed on Mar. 22, 2016, which claims priority to Chinese Patent Application No. 201510145112.0, filed on Mar. 30, 2015, the entire contents of each are hereby incorporated by reference.

TECHNICAL FIELD

This disclosure relates to image processing, and more particularly to image synthesis.

BACKGROUND

Internet-based webpages and social media platforms often include many images. In some situations, a large number of images may need to be generated within a short period of time (for example, Internet-based promotional events or activities). The images are often generated by synthesizing source image materials. For example, source files, such as a foreground image, foreground text, and a background image can be synthesized by combining the source files in desired positions into an image.

SUMMARY

The present disclosure describes methods and systems, including computer-implemented methods, computer program products, and computer systems for image synthesis.

In an implementation, a request is received for an image to be presented on a client computing device, where the image is synthesized by shared images and dedicated images dedicated to the client computing device. A first one or more source files are identified for generating the shared images that are used by the client computing device and one or more other client computing devices. The shared images are generated based on the first one or more source files. A second one or more source files are identified for generating the dedicated images. A configuration file is generated that includes instructions for the client computing device to synthesize the shared images and the second one or more source files to the requested image. The shared images, the second one or more source files, and the configuration file are sent to the client computing device.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, because a server may only need to generate shared images rather than synthesizing an image using both shared and dedicated images, the computational burden can be reduced and the corresponding image synthesizing efficiency can be increased. Second, by sending shared images rather than source files to a client computing device, the amount of data and the corresponding bandwidth consumption can be reduced. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes image synthesis technology, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Internet-based webpages and social media platforms often include many images. In some situations, a large number of images may need to be generated within a short period of time (for example, Internet-based promotional events or activities). The images are often generated by synthesizing source image materials. For example, source files, such as a foreground image, foreground text, and a background image can be synthesized by combining the source files in desired positions into an image.

Internet services are normally provided by servers to client computing devices. For some services where image synthesis is needed, a server can directly synthesize source files into an image and send the image to a client computing device. Directly synthesizing source files can consume a large amount of computational power and can be especially challenging when a large number of source files need to be processed. In some instances, the server can send source files and synthesis information to a client computing device to perform image synthesis. The size of source files is normally much larger than a synthesized image. As a result, sending all source files to the client computing device can consume a large amount of communication bandwidth.

Figure 1:
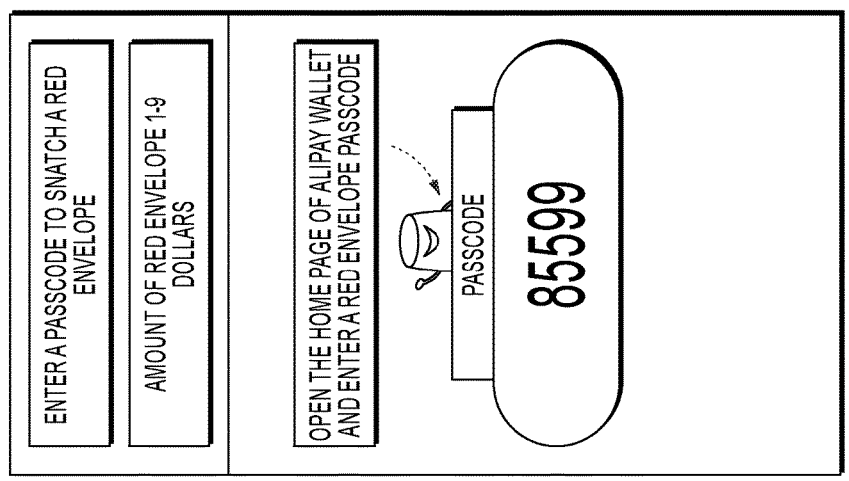
FIG. 1 shows an example of two images used in a promotion activity, according to an implementation of the present disclosure.
Figure 1:
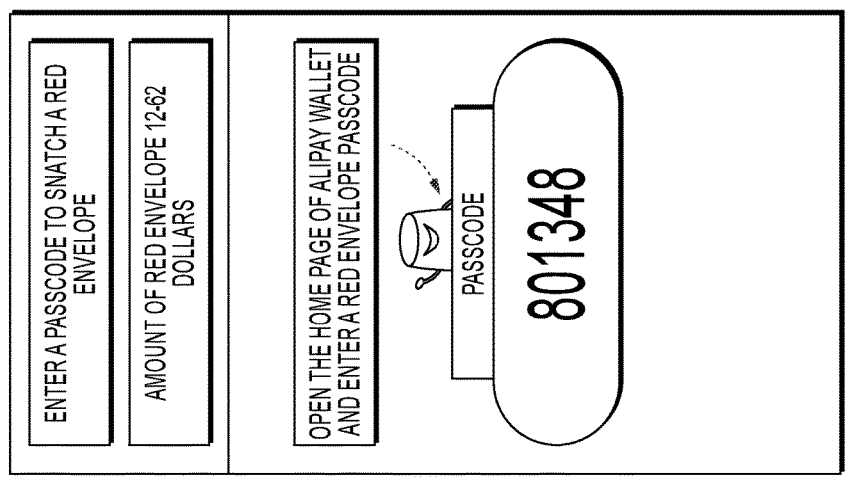

FIG. 1 shows an example 100 of two images used in a promotion activity, according to an implementation of the present disclosure. The images 100 represent different user interfaces of a mobile application, ALIPAY, where a user or a client is prompted to enter a five or six-digit passcode to snatch a red envelope. In example 100, the background image and the instruction to enter the passcode are the same, only the displayed passcodes and amounts with respect to the red envelopes are different.

In some implementations, images used for synthesizing an image can be classified into two types: 1) shared images that can be commonly used by more than one client and 2) dedicated images that correspond to a specific client. The synthesized image can be formed by synthesizing shared images and dedicated images in different ways according to different implementations. For example, a dedicated image can be overlaid on a shared image background or can border a shared image side-by-side. In some cases, share images can be associated with a service type. That is, images for a particular type of service can have one or more shared images in common, and images for different types of services can have different shared images. In some cases, the shared images can be associated with user types. That is, images for a particular type of user can have one or more shared images in common, and images for different types of user can have different share images. Similarly, it is to be understood that a shared image can be associated with both a service type and a user type, and a dedicated image can be used by one or more users, depending on particular implementations, without departing from the scope of this disclosure.

In some implementations, a server can generate shared images and send the shared images, source files for generating dedicated images, and configuration instructions for an image to a client computing device for synthesis. Because the server may only need to generate shared images rather than synthesizing the image using both shared and dedicated images, a computational burden can be reduced. Moreover, by sending the shared images rather than the source files to the client computing device, bandwidth consumption can be reduced.

Figure 2:
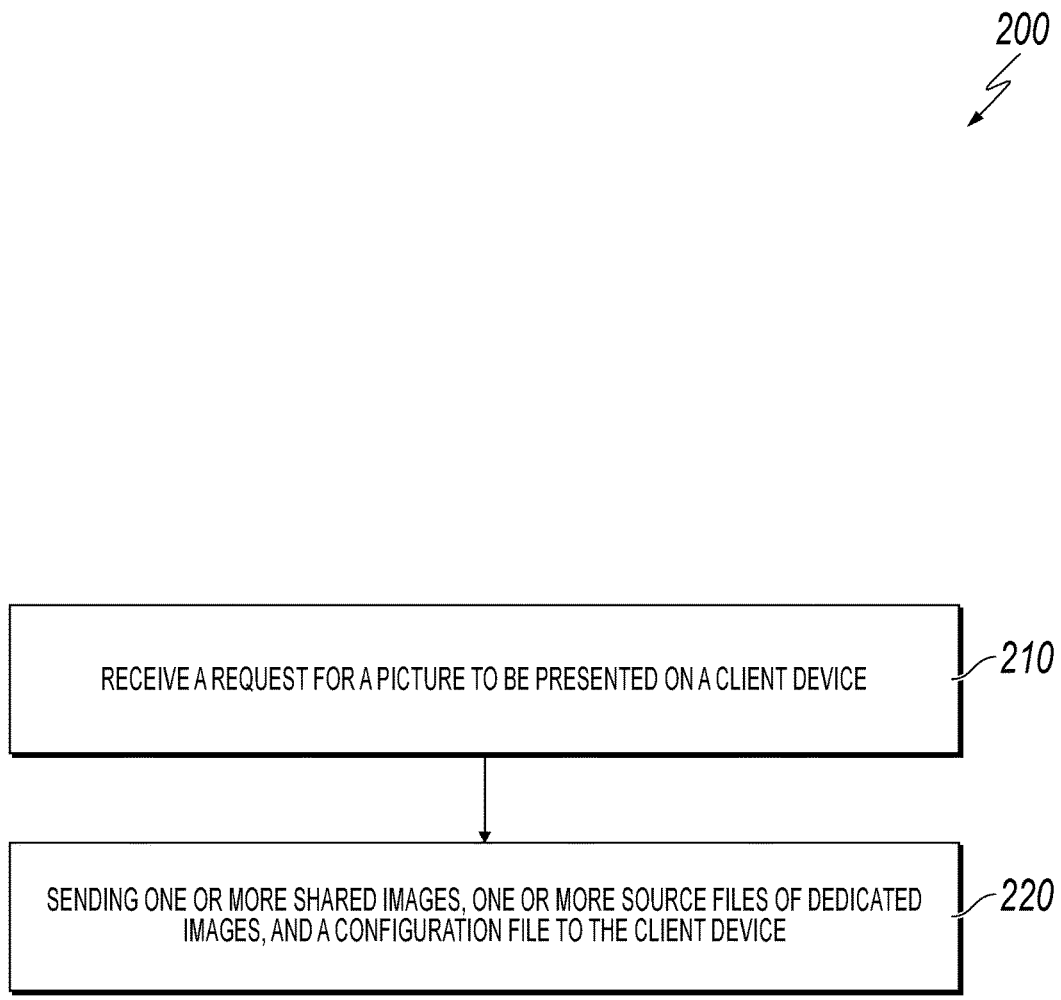
FIG. 2 is a flowchart illustrating an example method for image synthesis, according to an implementation of the present disclosure.

FIG. 2 is a flowchart illustrating an example method 200 for image synthesis, according to an implementation of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order. In some implementations, the example method 200 can be performed by a server.

At 210, the server receives a request associated with presenting an image on a user interface of a client computing device. From 210, method 200 proceeds to 220.

At 220, the server sends one or more shared images, source files of one or more dedicated images, and a configuration file for synthesizing the image to the client computing device.

The shared images can be generated by at least a portion of source files of the image. In some cases, the shared images are determined by extracting common image elements of a large number of images associated with a service type of a user type. The shared images can be image elements shared by all users of a service or a portion of them. Image elements other than the shared images can be images dedicated to a user of the image.

Figure 3:
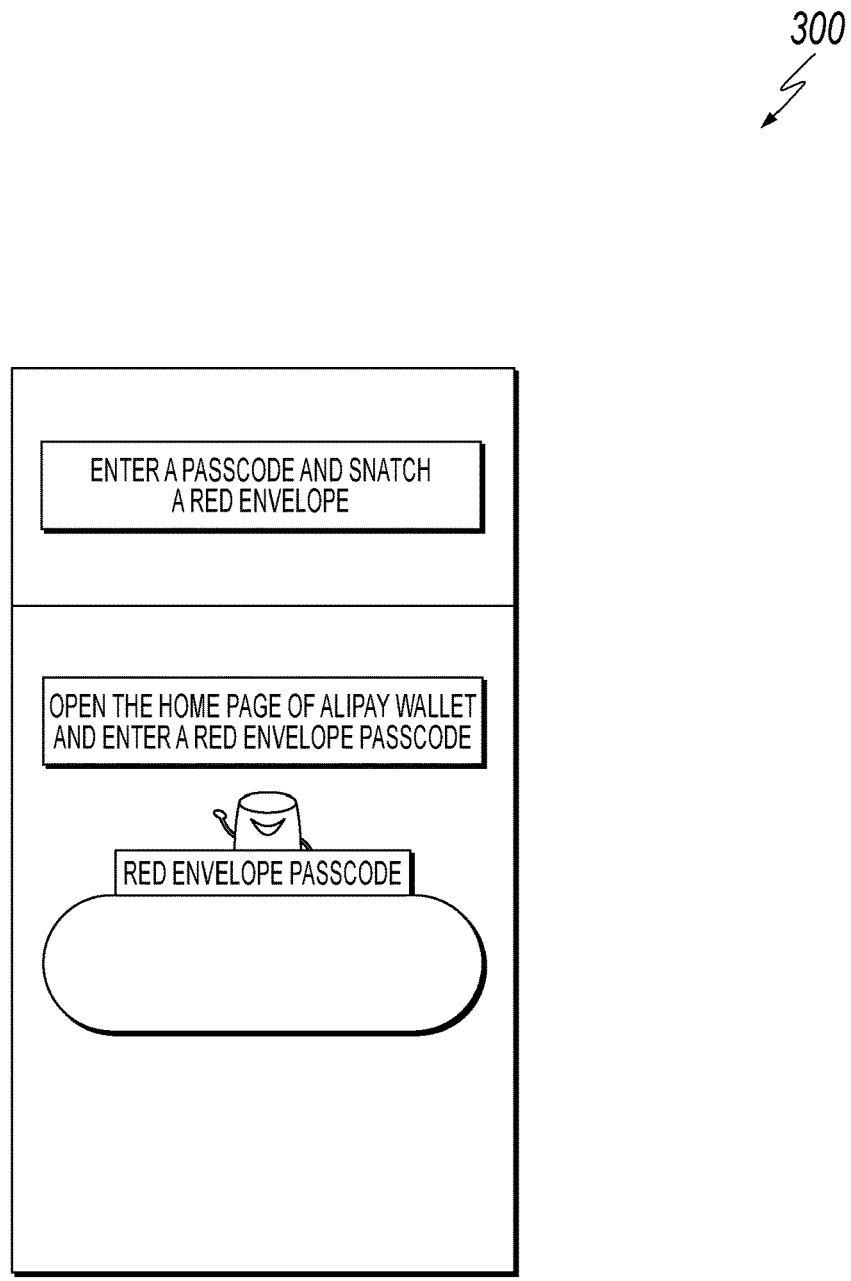
FIG. 3 shows an example of shared images of the images in FIG. 1, according to an implementation of the present disclosure.

In some cases, convenience and aesthetics can be considered when classifying shared images and dedicated images. For example, referring to FIG. 1, although the image elements "Red Pocket Amount" and "Dollar" are common to both images, the width of the numbers in between can vary based on an actual dollar amount. The different widths can affect the aesthetics of the entire line 110 when "Red Pocket Amount" and "Dollar" are shared image elements with a fixed separation common to different users. In such cases, the image elements of the entire line 110 can be classified as a dedicated image. FIG. 3 shows an example 300 of shared images of the images in FIG. 1, according to an implementation of the present disclosure.

The server can choose source files from all available source files associated with the image to synthesize shared images. In some cases, when the shared images are unrelated to the substantive content (for example, a dollar amount for payment or a passcode to gain access) requested by a user, the server can synthesize the shared images in advance without receiving any image synthesis requests. However, when the shared images are dependent on content requested by a user, the server can generate the shared image after receiving the request and determining the content requested by the user.

The server can send the shared images, the source files for generating the dedicated images, and the configuration file to the client computing device. The configuration file can include operational information that can be performed by the client computing device to synthesize the shared images and the source files of the dedicated images into the synthesized image. Alternatively, the configuration file can include instructions to notify the client computing device on how the shared images and source files can be synthesized into the image. For example, the configuration file can include instructions for image composition methods, image element positions, and special processing that can be performed on the shared images or the source files. As another example, the configuration file can include instructions on how to superimpose the source files for dedicated images into the shared images, positions, sizes, or rotation angles of the source files, or methods to determine the positions, sizes, or rotation angles of the source files.

After receiving the described content from the server, the client can synthesize the shared image and the received source files into an image according to the configuration file. From the perspective of the client, the shared image can be treated as one of the source files for synthesizing the image. In some cases, the client computing device can also synthesize content added or input by a user with other materials, such as source files and shared images, to the image. In some cases, a user can customize the manner in which the materials can be synthesized to the image.

Depending on the particular implementation, the server can use different methods to handle configuration files, shared images, and source files of dedicated images. In some cases, the server can generate user-specific configuration files and source files of dedicated images for each user. In some other cases, for images with shared images, the server can send the same shared images, source files of dedicated images, and configuration files to a user. When an image is requested by a user, the server can generate textual information that can indicate or correspond to the source files to be used to generate the dedicated images and send the textual information to the user. The user can then select the source files based on the textual information and perform image synthesis based on the selected source files, shared images, and the configuration file. Because computational resources used for processing textual information can be less than the resources used for image processing, computational load on the server can be reduced.

In some cases, images for different types of services can have different common features. In such cases, the server can generate and organize shared images based on types of services. The server can include shared images related to a service type, source files of dedicated images, and configuration files in a service-related file package. After receiving an image request, the server can generate textual information that can indicate or correspond to source files to be used to generate the dedicated images, and configuration files, based on the requested image and its related service type, and send the textual information and the service-related file package to the user. The user can then select shared images and source files from the service-related file package and synthesize them into the requested image based on the configuration file.

As discussed, the shared images can be generated by the server, and the shared images and source files of dedicated images can be synthesized to an image at the client computing device. The server can only need to generate a portion of images (that is, the shared images) that can be used by more than one user for image synthesizing. Thus the load of the server can be reduced. The client computing device can only need to receive source files for its dedicated images rather than source files for both shared and dedicated images. Thus the bandwidth consumption of sending source files can be reduced.

The server referred to in the present disclosure can include one or more logical servers, one or more physical servers, or any combinations thereof. In some implementations, the server can include two logical servers, a service server, and an image server. The service server can be used for receiving and responding to service requests from client. The image server can be used for generating and sending service-related file packages that correspond to the service type associated with the requested image.

The image server can categorize images used for image synthesis into shared images and dedicated images based on types of services. The image server can include shared images that correspond to a service type, source files for generating dedicated images, and the corresponding configuration file in a service-related file package and save them in a computer memory.

Figure 4:
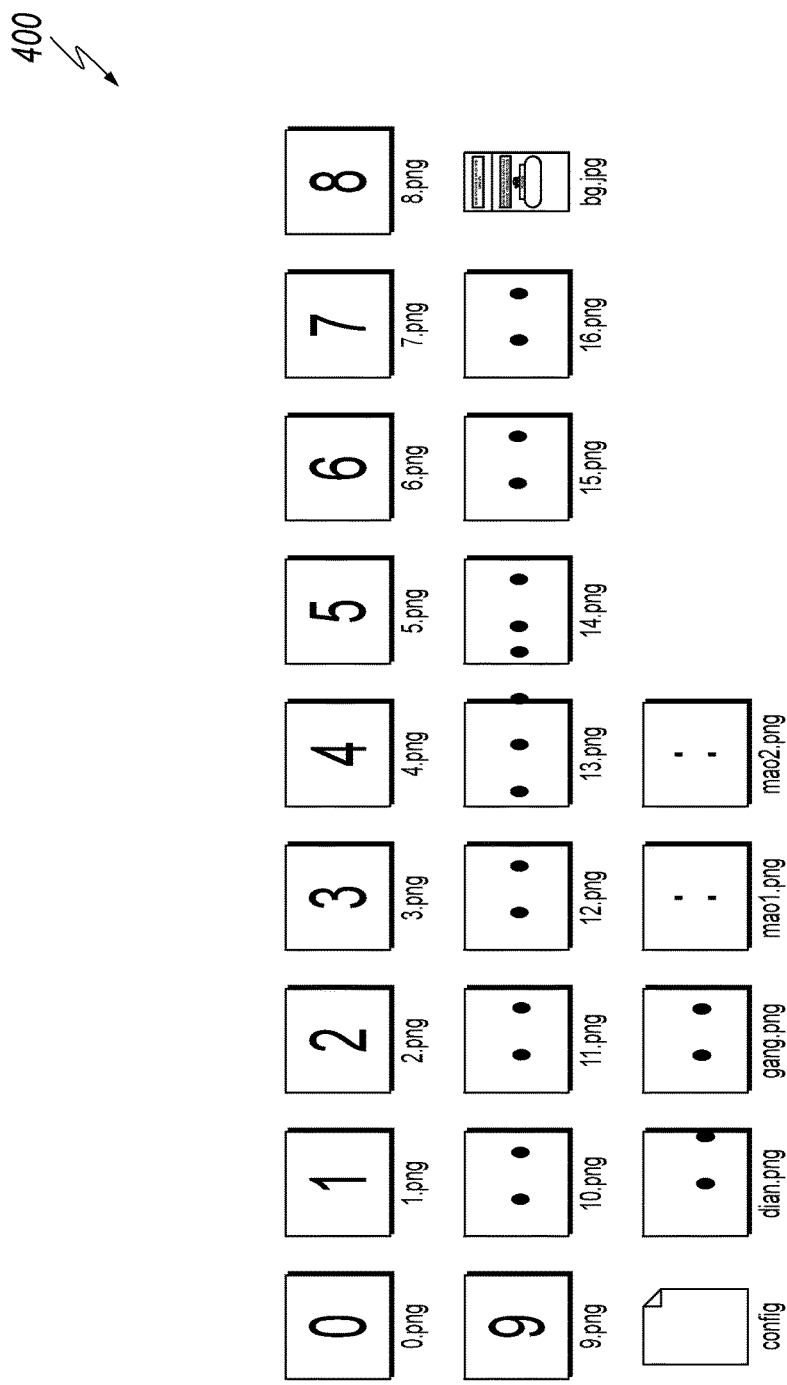
FIG. 4 shows an example file package associated with the images in FIG. 1, according to an implementation of the present disclosure.

FIG. 4 shows an example file package 400 associated with images in FIG. 1, according to an implementation of the present disclosure. As discussed in the description of FIG. 1, the example images 100 in FIG. 1 are used by ALIPAY's red envelope snatching service. Therefore, the example file package is related to ALIPAY's red envelope snatching service. The bg.jpg file can be the shared image of the passcode entering field. The configuration file can be the configuration file. The other files can be source files for generating the dedicated images of the images to be synthesized. Each Chinese character or symbol image file for generating dedicated images can be a source file in the PNG image format.

Figure 5:
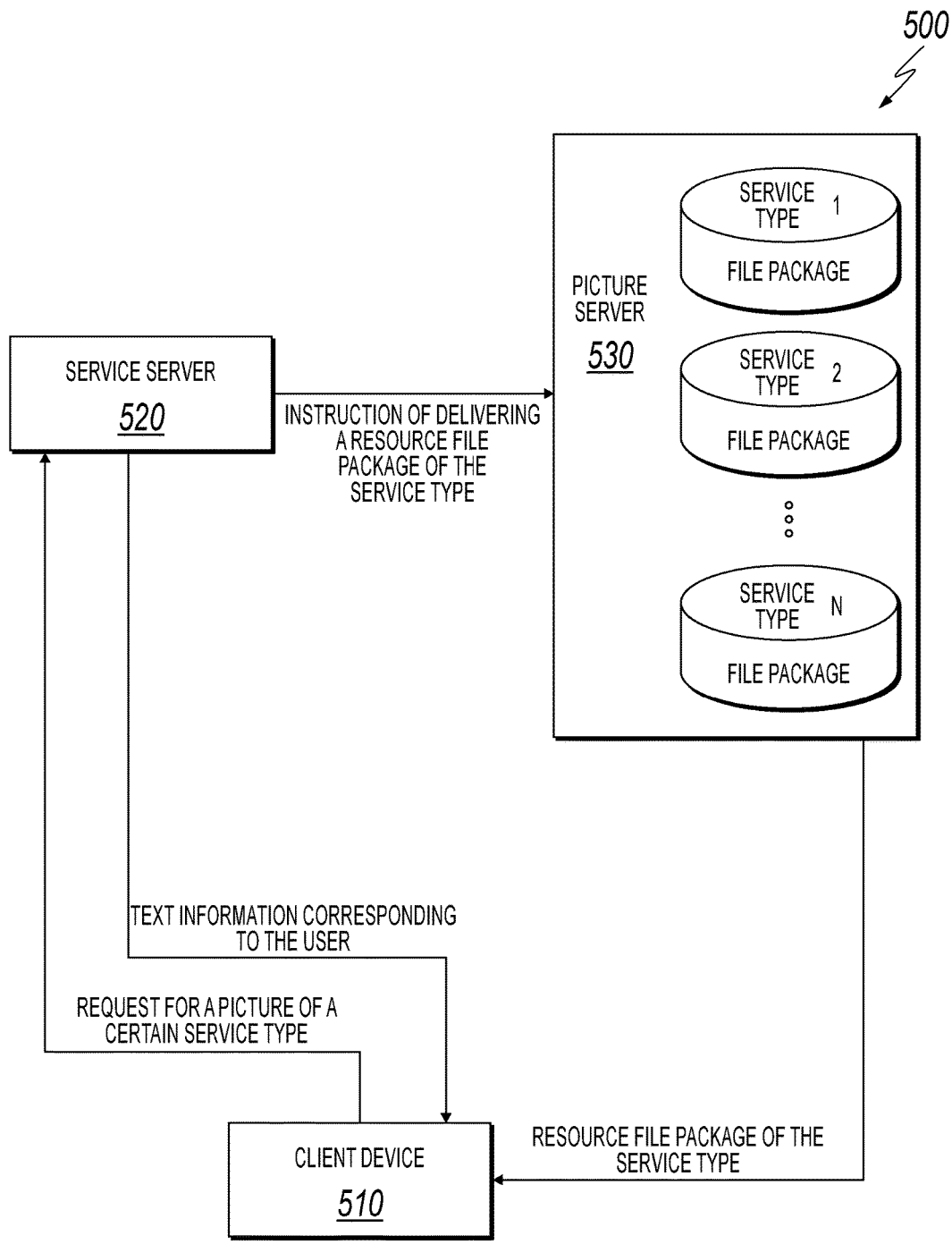
FIG. 5 is a flow diagram illustrating an example of image synthesizing performed by a client computing device and a server, according to an implementation of the present disclosure.

FIG. 5 is a flow diagram illustrating an example 500 of image synthesizing performed by a client computing device 510 and a server, according to an implementation of the present disclosure. In this example 500, the server can include a service server 520 and an image server 530.

The client computing device 510 can initiate a request for an image for a certain service type to the service server 520. After receiving the request, the service server 520 can send instructions to the image server 530 to prepare a service-related file package. The instructions can include a service type related to the requested image and the file package, and an address of the client computing device to deliver the file package. The service server 520 can also generate textual information indicating files to be used to synthesize the image and send to the client computing device 510. In some cases, the service server 520 can send the textual information to the image server to be included in the file package. In some cases, the image server 530 can generate the textual information and include it in the file package. The image server 530 can prepare the service-related file package based on the instructions received from the service server 520, and send the service-related file package to the client computing device. After receiving the textual information from the service server 520 and the file package from the image server 530, the client computing device 510 can synthesize the image and present it to the user of the client computing device 510.

Figure 6:
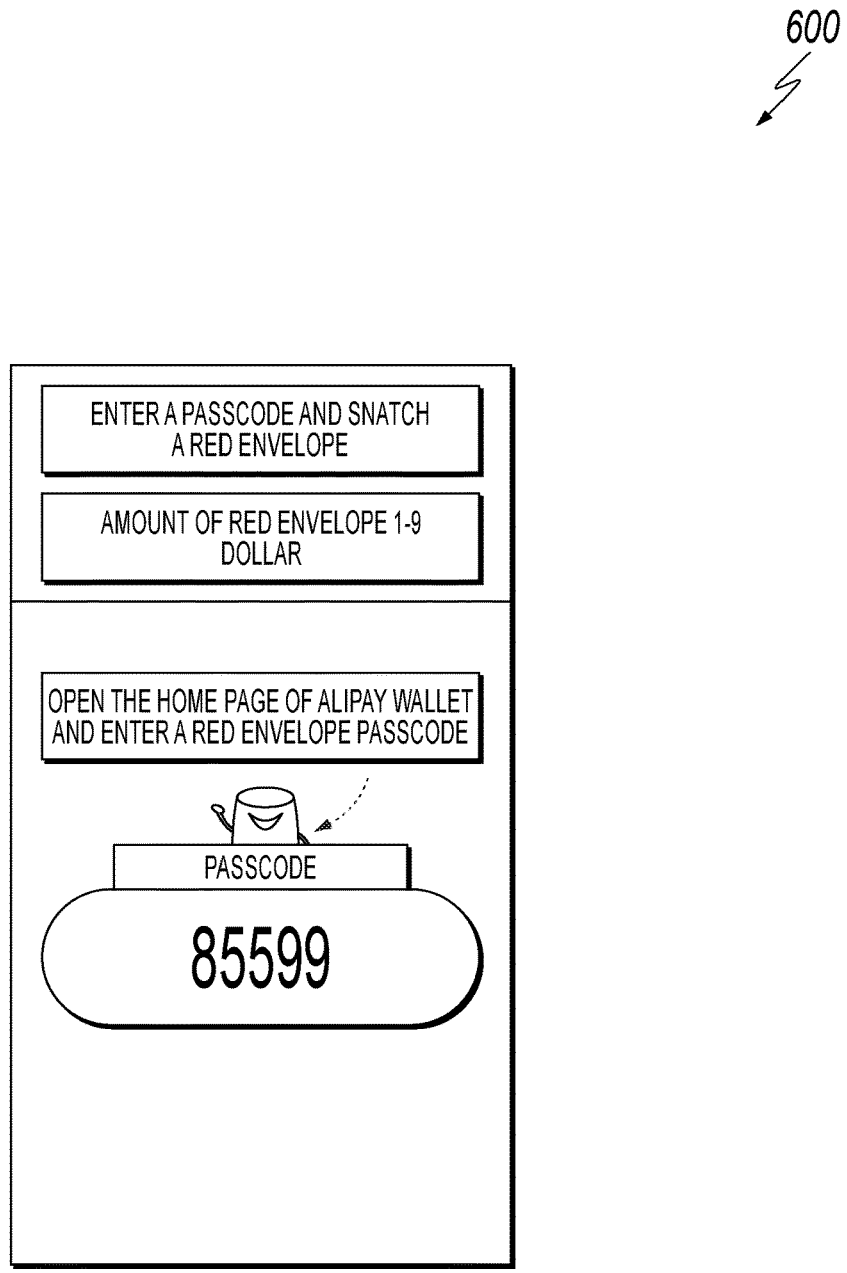
FIG. 6 shows an example of a synthesized image on a client computing device, according to an implementation of the present disclosure.

Using again the ALIPAY red envelope snatching service as an example, assume that a passcode image of an ALIPAY red envelope as shown in FIG. 6 is requested by the client computing device 510, example textual information generated by the service server 520 could include: "amount of red envelope 1-9 dollars" and "passcode=85599." The configuration file included in the file package sent by the image server 530 to the client computing device 510 could include the following:

```
"width": 640,
"height": 1135,
"fonts": {
"0": {
"path": "0.png" // the source file corresponding to the number "0" is 0.png
},
"red": {
"path": "10.png" // the source file corresponding to the Chinese character "red" is 10.png
},
},
"variables": {
"password": {
"type": "text",
"x": 110, // a start point coordinate x of the line "passcode"
"y": 740, // a start point coordinate y of the line "passcode"
```

-continued

```
"angle": 0, // an inclined angle of the character string of the line
"passcode"
"length": 420, // the length of the character string "password"
"rotate": 0, // the maximum angle that a single character of the line
"passcode" can randomly rotate
"fontColor": "0xff59493f" // the color of the character string of the line
"password"
},
}.
```

The client computing device 510 can determine the source files based on the received textual information "amount of red envelope 0-9 dollar" and synthesize with shared images (for example, the bg.jpg file shown in FIG. 4) according to the sizes and positions indicated in the configuration file. For textual information "passcode=85599," the client computing device 510 can synthesize source files corresponding to "85599" to shared images based on the coordinate and position information for the word "passcode" indicated in the configuration file. FIG. 6 shows an example 600 of a synthesized image on a client computing device, according to an implementation of the present disclosure.

In some implementations, the configuration file can further include instructions on calculating source file configurations such as positions, sizes, and rotation angles for image synthesis. For example, a character string comprising N characters can be composed on a straight line that starts at coordinates (x, y). The variable "length" can indicate the length of the character string. The variable "angle" can indicate the inclined angle (with respect to the X axis) of the character string. The configuration file can instruct the center of a source file image that corresponds to the ith character to be positioned at coordinates calculated as:

$$(x_i, y_i) = (x + (I^* \text{length}/N)^* \cos(\text{angle}), y + (I^* \text{length}/N)^* \sin(\text{angle}))$$

The size of each source file image to be presented in the image can be calculated as:

$$(\text{width}, \text{height}) = (\text{length}/N, \text{length}/N)$$

In case the characters are preferred to be presented at a random rotation angle in the image, the rotation angle of the corresponding source file images can be calculated as:

$$\text{angle} + \text{random}(\text{rotate}) - \text{rotate}/2$$

where the variable "rotate" is the maximum angle that the source file image of each character can randomly rotate from the inclined angle.

Figure 7:
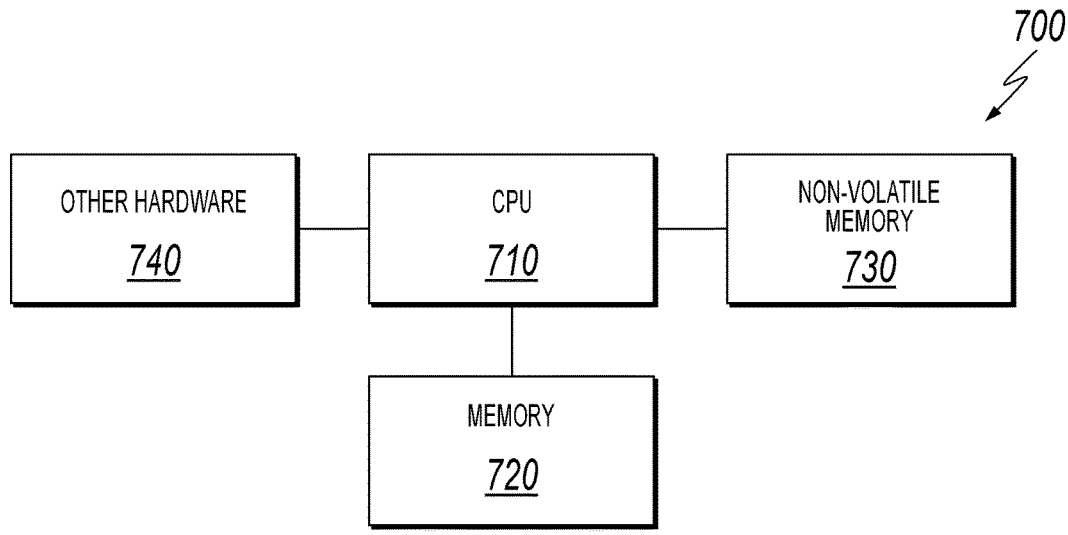
FIG. 7 is a block diagram illustrating an example image synthesis apparatus, according to an implementation of the present disclosure.

FIG. 7 is a block diagram illustrating an example image synthesis apparatus 700, according to an implementation of the present disclosure. The example image synthesizing apparatus 700 can include a CPU 710, a memory 720, a non-volatile memory 730, and other hardware. The image synthesis apparatus 700 can be used to perform one or more implementations disclosed in the present disclosure. The image synthesizing apparatus 700 can be embodied in software form, hardware form, or a combination of software and hardware. From a software stand point, the image synthesizing apparatus can be embodied based on processing computer-readable instructions reading from memory 720 by a CPU 710. In such case the image synthesizing apparatus 700 is a logic device. From a hardware stand point, the image synthesizing apparatus 700 can further include other hardware 740 such as communication modules other than CPU 710, memory 720, non-volatile memory 730 for the purpose of synthesizing images.

Figure 8:
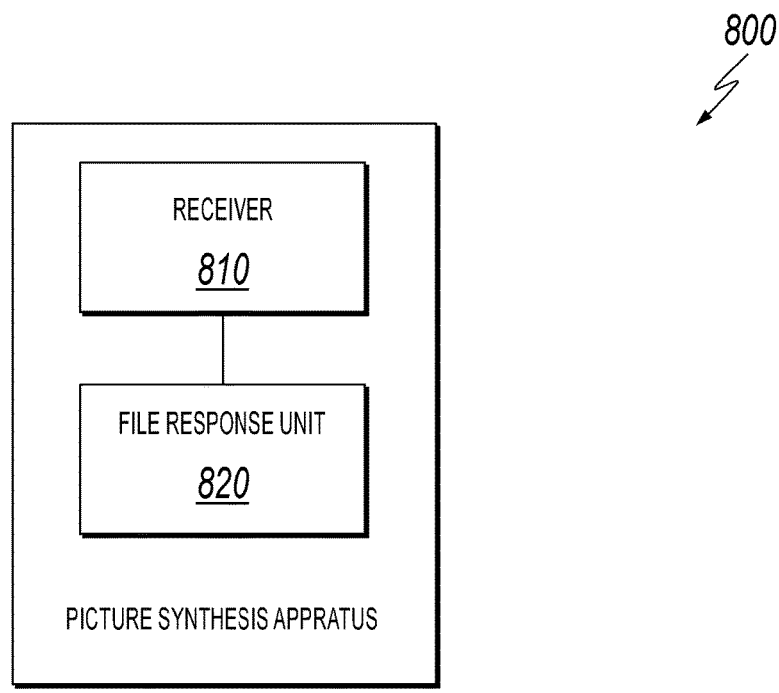
FIG. 8 is a logic structure diagram illustrating an example image synthesis apparatus, according to an implementation of the present disclosure.

FIG. 8 is a logic structure diagram illustrating an example image synthesis apparatus 800, according to an implementation of the present disclosure. The example image synthesis apparatus 800 can include a receiver 810 and a file response unit 820. The receiver can receive a request for an image from a client computing device. The file response unit 820 can send shared images, source files of dedicated images, and configuration files to the client computing device based on the requested image. In some cases, the shared images can be generated by source files that correspond to a service type.

In some cases, the image synthesis apparatus 800 can further include a text response unit (not shown). The text response unit can generate textual information that can indicate or correspond to source files to be used by the client computing device to generate the dedicated images and send the textual information to the user.

In some cases, the image synthesis apparatus 800 can further include a file package generation unit (not shown). The file package generation unit 840 can include shared images associated with a service type, source files of dedicated images, and configuration files in a service-related file package. The service-related file package can be sent to clients who requested a certain service type.

In some cases, the image synthesis apparatus 800 can further include a first shared image unit (not shown) or a second shared image unit not shown. The first shared image unit can use one or more source files to generate shared images before receiving any image requests from the user. The second shared image unit can use one or more source files to generate shared images based on an image request.

In some cases, the configuration file can include positions, sizes, and rotation angles for synthesizing source files of dedicated images to shared images. Alternatively, the configure file can include calculation methods for determining the positions, sizes and rotation angles of the source files in the synthesized image.

Figure 9:
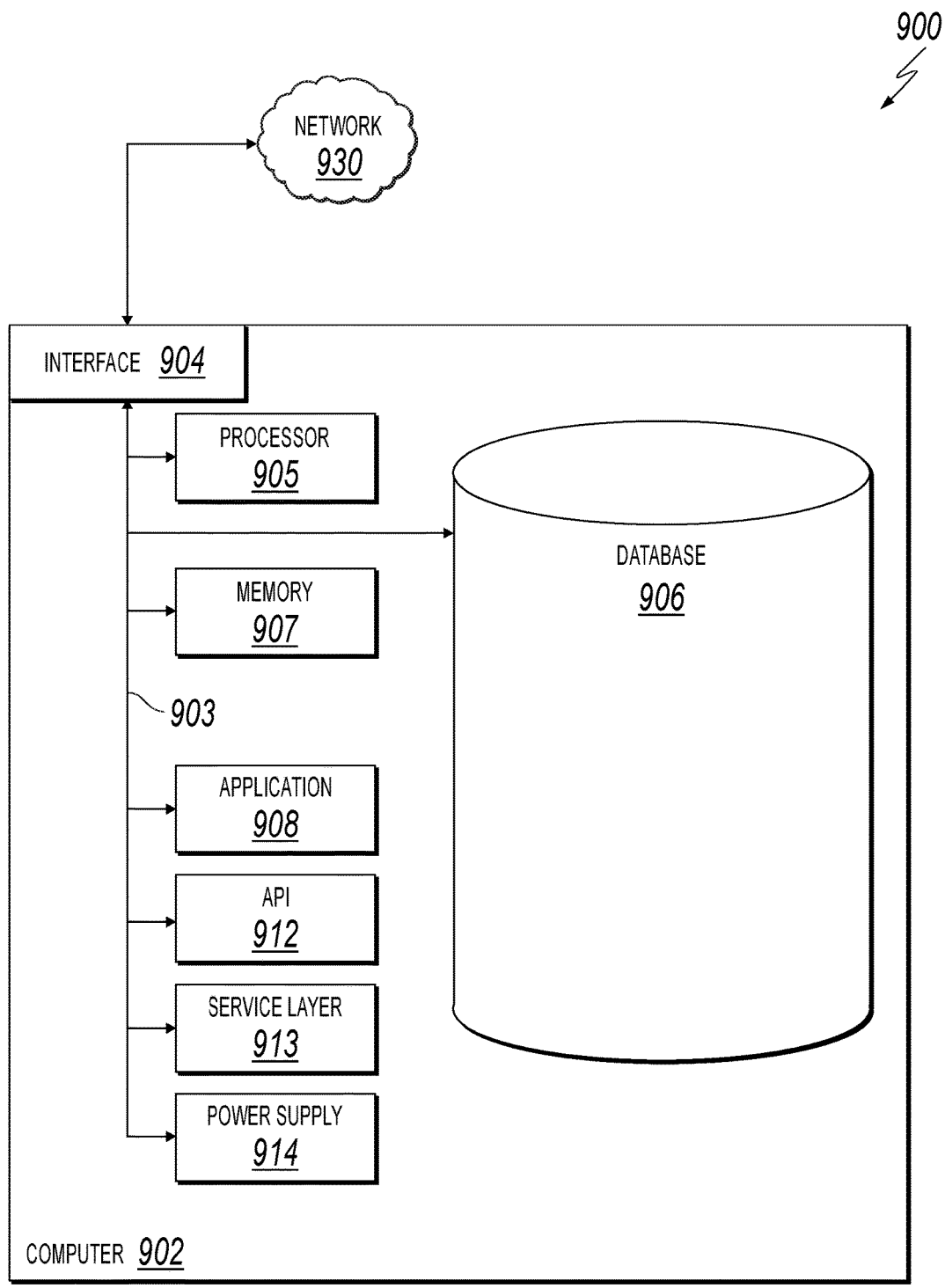
FIG. 9 is a block diagram illustrating an example computer system used to provide computational functionalities associated with described algorithms, methods, functions, processes, flows, and procedures as described in the instant disclosure, according to an implementation of the present disclosure.

FIG. 9 is a block diagram illustrating an example of a computer system 900 used to provide computational functionalities associated with described algorithms, methods, functions, processes, flows, and procedures, according to an implementation of the present disclosure. The illustrated computer 902 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 902 can comprise a computer that includes an input device, such as a keypad, keyboard, touch screen, another input device, or a combination of input devices that can accept user information, and an output device that conveys information associated with the operation of the computer 902, including digital data, visual, audio, another type of information, or a combination of types of information, on a graphical-type user interface (UI) (or GUI) or other UI.

The computer 902 can serve in a role in a computer system as a client, network component, a server, a database or another persistency, another role, or a combination of roles for performing the subject matter described in the present disclosure. The illustrated computer 902 is communicably coupled with a network 930. In some implementations, one or more components of the computer 902 can be configured to operate within an environment, including cloud-computing-based, local, global, another environment, or a combination of environments.

At a high level, the computer 902 is an electronic computing device operable to receive, transmit, process, store, or manage data and information associated with the described subject matter. According to some implementations, the computer 902 can also include or be communicably coupled with a server, including an application server, e-mail server, web server, caching server, streaming data server, another server, or a combination of servers.

The computer 902 can receive requests over network 930 (for example, from a client software application executing on another computer 902) and respond to the received requests by processing the received requests using a software application or a combination of software applications. In addition, requests can also be sent to the computer 902 from internal users (for example, from a command console or by another internal access method), external or third-parties, or other entities, individuals, systems, or computers.

Each of the components of the computer 902 can communicate using a system bus 903. In some implementations, any or all of the components of the computer 902, including hardware, software, or a combination of hardware and software, can interface over the system bus 903 using an application programming interface (API) 912, a service layer 913, or a combination of the API 912 and service layer 913. The API 912 can include specifications for routines, data structures, and object classes. The API 912 can be either computer-language independent or dependent and refer to a complete interface, a single function, or even a set of APIs. The service layer 913 provides software services to the computer 902 or other components (whether illustrated or not) that are communicably coupled to the computer 902. The functionality of the computer 902 can be accessible for all service consumers using this service layer. Software services, such as those provided by the service layer 913, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 902, alternative implementations can illustrate the API 912 or the service layer 913 as stand-alone components in relation to other components of the computer 902 or other components (whether illustrated or not) that are communicably coupled to the computer 902. Moreover, any or all parts of the API 912 or the service layer 913 can be implemented as a child or a sub-module of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902. The interface 904 is used by the computer 902 for communicating with another computing system (whether illustrated or not) that is communicatively linked to the network 930 in a distributed environment. Generally, the interface 904 is operable to communicate with the network 930 and comprises logic encoded in software, hardware, or a combination of software and hardware. More specifically, the interface 904 can comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors can be used according to particular needs, desires, or particular implementations of the computer 902. Generally, the processor 905 executes instructions and manipulates data to perform the operations of the computer 902 and any algorithms, methods, functions, processes, flows, and procedures as described in the present disclosure.

The computer 902 also includes a database 906 that can hold data for the computer 902, another component communicatively linked to the network 930 (whether illustrated or not), or a combination of the computer 902 and another component. For example, database 906 can be an in-memory, conventional, or another type of database storing data consistent with the present disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases of similar or differing types can be used according to particular needs, desires, or particular implementations of the computer 902 and the described functionality. While database 906 is illustrated as an integral component of the computer 902, in alternative implementations, database 906 can be external to the computer 902.

The computer 902 also includes a memory 907 that can hold data for the computer 902, another component or components communicatively linked to the network 930 (whether illustrated or not), or a combination of the computer 902 and another component. Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 or similar or differing types can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in the present disclosure. For example, application 908 can serve as one or more components, modules, or applications. Further, although illustrated as a single application 908, the application 908 can be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or another power management functionality). In some implementations, the power-supply 914 can include a power plug to allow the computer 902 to be plugged into a wall socket or another power source to, for example, power the computer 902 or recharge a rechargeable battery.

There can be any number of computers 902 associated with, or external to, a computer system containing computer 902, each computer 902 communicating over network 930. Further, the term "client," "user," or other appropriate terminology can be used interchangeably, as appropriate, without departing from the scope of the present disclosure. Moreover, the present disclosure contemplates that many users can use one computer 902, or that one user can use multiple computers 902.

Figure 10:
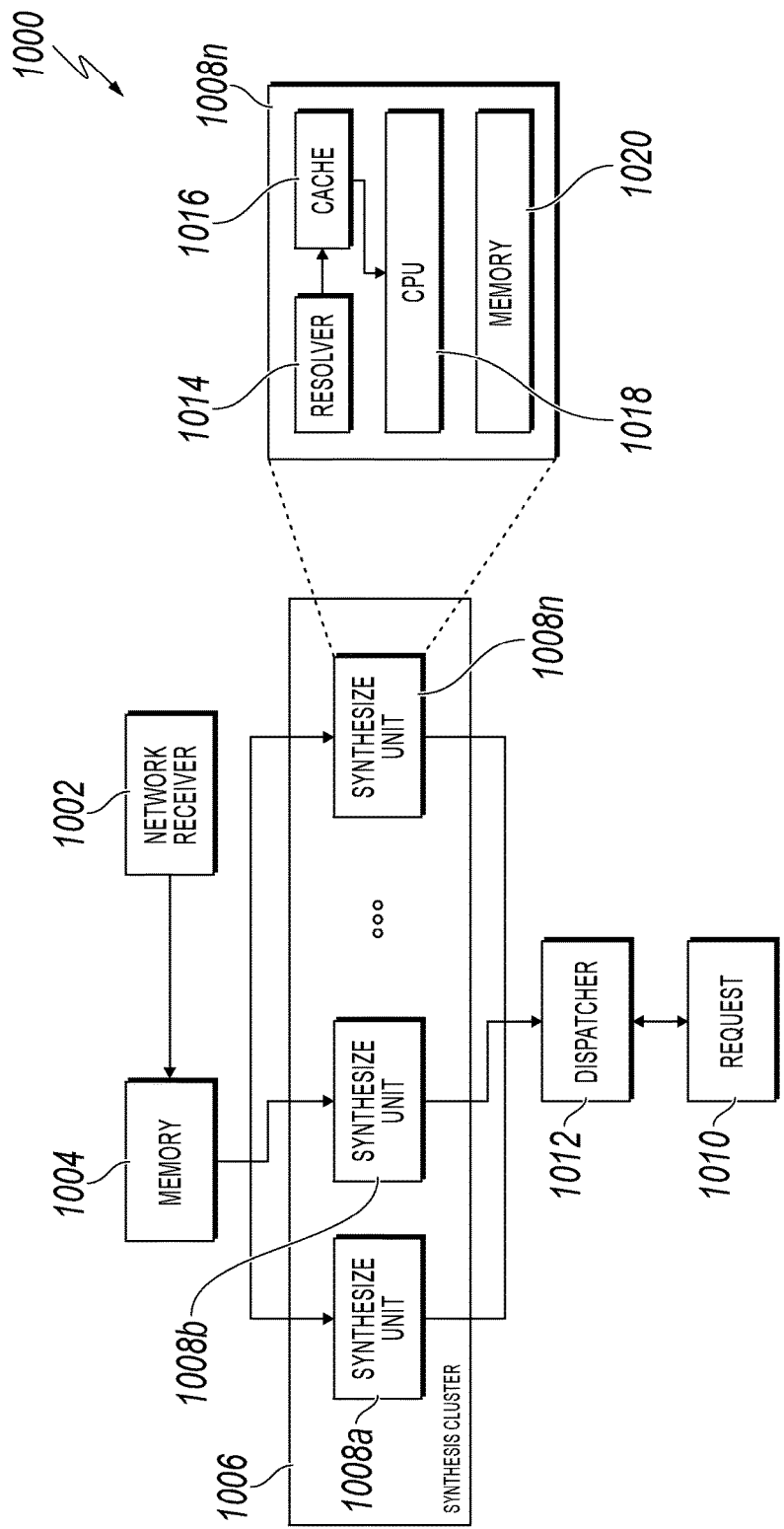
FIG. 10 is a block diagram illustrating a combined hardware-software system, according to an implementation of the present disclosure.

FIG. 10 is a block diagram illustrating a combined hardware-software system 1000, according to an implementation of the present disclosure. Each illustrated component can be considered, where applicable, and consistent with this disclosure, to be software, hardware, or a combination of both. As illustrated in FIG. 10, a Network Receiver 1002 (for example, Interface 904 in FIG. 9) accepts a data package (for example, first shared images, configuration data, and files) transmitted by a computing device (for example, a server (not illustrated)) interoperably coupled to system 1000 using a network (for example, a Network 930 in FIG. 9). The data package is stored in a Memory 1004 (for example, Memory 907 in FIG. 9). In some implementations, the data package can be stored in the Memory 1004 by the Network Receiver 1002 or other component of system 1000 (not illustrated).

Synthesize Units 1008a-1008n are configured to synthesize a final image in response to a Request 1010 (for example, received from a client computing device). Synthesize Units are grouped into a Synthesis Cluster 1006. In some implementations, Synthesize Units can be clustered into one or more Synthesis Clusters 1006 according to criteria such as, data type, geographical location, network connection speed, a particular client/business, or any other criteria consistent with this disclosure. The number of available Synthesize Units is dynamically configurable (for example, by an administrator or computer algorithm based on, processing needs, bandwidth, load on a particular Synthesize Unit, desired system 1000 throughput, or other consideration consistent with this disclosure).

In typical implementations, each Synthesize Unit loads the data package from Memory 1004. Received Requests 1010 are dispatched to different Synthesize Units by a Dispatcher 1012. In some implementations, the Dispatcher 1012 dispatches a received Request 1010 to an idle/least busy Synthesize Unit. In other implementations, Dispatcher 1012 can dispatch a received Request 1010 to a particular Synthesize Unit based on any criteria consistent with this disclosure (for example, geographical location, network connection speed, or a configuration to dispatch particular data to particular Synthesize Units).

As illustrated in FIG. 10, each Synthesize Unit (for example, Synthesize Unit 1008n) can include a resolver 1014, Cache 1016, CPU 1018, and Memory 1020. Resolver 1014 can be used to resolve data values, paths (relative and absolute), and functions. Cache 1016 can be used to store data for processing and rapid access by the Synthesize Unit 1008n or other components of system 1000. CPU 1018 and Memory 1020 can be considered to be consistent with the descriptions of Processor 905 and Memory 907, respectively, in FIG. 9, but for use for the particular purposes of the Synthesize Unit 1008n.

Described implementations of the subject matter can include one or more features, alone or in combination.

For example, in a first implementation, a computer-implemented method, comprises: receiving a request for an image to be presented on a client computing device that is synthesized by one or more shared images and one or more dedicated images dedicated to the client computing device; identifying a first one or more source files for generating the one or more shared images that are used by the client computing device and one or more other client computing devices; generating the one or more shared images based on the first one or more source files; identifying a second one or more source files for generating the one or more dedicated images dedicated to the client computing device; generating a configuration file that includes instructions for the client computing device to synthesize the one or more shared images and the second one or more source files to the requested image; and sending the one or more shared images, the second one or more source files, and the configuration file to the client computing device.

The foregoing and other described implementations can each, optionally, include one or more of the following features:

A first feature, combinable with any of the following features, further comprising: generating, based on the requested image, textual information that indicates at least a portion of the second one or more source files for generating the one or more dedicated images dedicated to the client computing device; and sending the textual information and the third one or more source files to the client computing device.

A second feature, combinable with any of the previous or following features, further comprising: identifying a third one or more source files for generating one or more dedicated images dedicated to the one or more other client computing devices; generating, based on the requested image, textual information that indicates at least a portion of the second one or more source files and the third one or more source files for generating the one or more dedicated images dedicated to the client computing device; and sending the textual information and the third one or more source files to the client computing device.

A third feature, combinable with any of the previous or following features, wherein: the first one or more source files, the second one or more source files, and the third one or more source files are identified based on a type of service the image is used for, and wherein the one or more shared image, the second one or more source files, and the third one or more source files are sent to the client computing device and the one or more other client computing devices as a file package related to the type of service.

A fourth feature, combinable with any of the previous or following features, further comprising generating one or more shared images before receiving the request for the image.

A fifth feature, combinable with any of the previous or following features, wherein the configuration file includes at least one of positions, sizes, or rotation angles for the second one or more source files to be synthesized relative to the one or more shared images.

A sixth feature, combinable with any of the previous or following features, wherein the configuration file includes computer-readable instructions for calculating at least one of positions, sizes, or rotation angles for the second one or more source files to be synthesized relative to the one or more shared images.

In a second implementation, a non-transitory, computer-readable medium storing one or more instructions executable by a computer system to perform operations comprises: receiving a request for an image to be presented on a client computing device that is synthesized by one or more shared images and one or more dedicated images dedicated to the client computing device; identifying a first one or more source files for generating the one or more shared images that are used by the client computing device and one or more other client computing devices; generating the one or more shared images based on the first one or more source files; identifying a second one or more source files for generating the one or more dedicated images dedicated to the client computing device; generating a configuration file that includes instructions for the client computing device to synthesize the one or more shared images and the second one or more source files to the requested image; and sending the one or more shared images, the second one or more source files, and the configuration file to the client computing device.

The foregoing and other described implementations can each, optionally, include one or more of the following features:

A first feature, combinable with any of the following features, further comprising one or more instructions to: generate, based on the requested image, textual information that indicates at least a portion of the second one or more source files for generating the one or more dedicated images dedicated to the client computing device; and sending the textual information and the third one or more source files to the client computing device.

A second feature, combinable with any of the previous or following features, further comprising one or more instructions to: identify a third one or more source files for generating one or more dedicated images dedicated to the one or more other client computing devices; generate, based on the requested image, textual information that indicates at least a portion of the second one or more source files and the third one or more source files for generating the one or more dedicated images dedicated to the client computing device; and send the textual information and the third one or more source files to the client computing device.

A third feature, combinable with any of the previous or following features, wherein the first one or more source files, the second one or more source files, and the third one or more source files are identified based on a type of service the image is used for, and wherein the one or more shared image, the second one or more source files, and the third one or more source files are sent to the client computing device and the one or more other client computing devices as a file package related to the type of service.

A fourth feature, combinable with any of the previous or following features, further comprising one or more instructions to generate one or more shared images before receiving the request for the image.

A fifth feature, combinable with any of the previous or following features, wherein the configuration file includes at least one of positions, sizes, or rotation angles for the second one or more source files to be synthesized relative to the one or more shared images.

A sixth feature, combinable with any of the previous or following features, wherein the configuration file includes computer-readable instructions for calculating at least one of positions, sizes, or rotation angles for the second one or more source files to be synthesized relative to the one or more shared images.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform one or more operations comprising: receiving a request for an image to be presented on a client computing device that is synthesized by one or more shared images and one or more dedicated images dedicated to the client computing device; identifying a first one or more source files for generating the one or more shared images that are used by the client computing device and one or more other client computing devices; generating the one or more shared images based on the first one or more source files; identifying a second one or more source files for generating the one or more dedicated images dedicated to the client computing device; generating a configuration file that includes instructions for the client computing device to synthesize the one or more shared images and the second one or more source files to the requested image; and sending the one or more shared images, the second one or more source files, and the configuration file to the client computing device.

The foregoing and other described implementations can each, optionally, include one or more of the following features:

A first feature, combinable with any of the following features, further comprising one or more operations to: generate, based on the requested image, textual information that indicates at least a portion of the second one or more source files for generating the one or more dedicated images dedicated to the client computing device; and send the textual information and the third one or more source files to the client computing device.

A second feature, combinable with any of the previous or following features, further comprising one or more operations to: identify a third one or more source files for generating one or more dedicated images dedicated to the one or more other client computing devices; generate, based on the requested image, textual information that indicates at least a portion of the second one or more source files and the third one or more source files for generating the one or more dedicated images dedicated to the client computing device; and send the textual information and the third one or more source files to the client computing device.

A third feature, combinable with any of the previous or following features, wherein the first one or more source files, the second one or more source files, and the third one or more source files are identified based on a type of service the image is used for, and wherein the one or more shared image, the second one or more source files, and the third one or more source files are sent to the client computing device and the one or more other client computing devices as a file package related to the type of service.

A fourth feature, combinable with any of the previous or following features, further comprising one or more operations to generate one or more shared images before receiving the request for the image.

A fifth feature, combinable with any of the previous or following features, wherein the configuration file includes at least one of positions, sizes, or rotation angles for the second one or more source files to be synthesized relative to the one or more shared images.

A sixth feature, combinable with any of the previous or following features, wherein the configuration file includes computer-readable instructions for calculating at least one of positions, sizes, or rotation angles for the second one or more source files to be synthesized relative to the one or more shared images.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/–R, DVD-RAM, DVD-ROM, HD-DVD, and BLU- RAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving a request for an image to be presented on a client computing device that is synthesized by one or more shared images and one or more dedicated images dedicated to the client computing device;
identifying a first one or more source files for generating the one or more shared images that are used by the client computing device and one or more other client computing devices;
generating the one or more shared images based on the first one or more source files;
identifying a second one or more source files for generating the one or more dedicated images dedicated to the client computing device;
generating a configuration file that includes instructions for the client computing device to synthesize the one or more shared images and the second one or more source files to the requested image;
sending the one or more shared images, the second one or more source files, and the configuration file to the client computing device;
synthesizing, by the client computing device using operational information included with the configuration file, the one or more shared images and the second one or more source files to produce a synthesized image; and
presenting, on the client computing device, the synthesized image.

2. The computer-implemented method of claim 1, further comprising:
generating, based on the requested image, textual information that indicates at least a portion of the second one or more source files for generating the one or more dedicated images dedicated to the client computing device; and
sending the textual information and the third one or more source files to the client computing device.

3. The computer-implemented method of claim 1, further comprising:
identifying a third one or more source files for generating one or more dedicated images dedicated to the one or more other client computing devices;
generating, based on the requested image, textual information that indicates at least a portion of the second one or more source files and the third one or more source files for generating the one or more dedicated images dedicated to the client computing device; and
sending the textual information and the third one or more source files to the client computing device.

4. The computer-implemented method of claim 3, wherein the first one or more source files, the second one or more source files, and the third one or more source files are identified based on a type of service the image is used for, and wherein the one or more shared image, the second one or more source files, and the third one or more source files are sent to the client computing device and the one or more other client computing devices as a file package related to the type of service.

5. The computer-implemented method of claim 1, further comprising generating one or more shared images before receiving the request for the image.

6. The computer-implemented method of claim 1, wherein the configuration file includes at least one of positions, sizes, or rotation angles for the second one or more source files to be synthesized relative to the one or more shared images.

7. The computer-implemented method of claim 1, wherein the configuration file includes computer-readable instructions for calculating at least one of positions, sizes, or rotation angles for the second one or more source files to be synthesized relative to the one or more shared images.

8. A non-transitory, computer-readable medium storing one or more instructions executable by a computer system to perform operations comprising:
receiving a request for an image to be presented on a client computing device that is synthesized by one or more shared images and one or more dedicated images dedicated to the client computing device;
identifying a first one or more source files for generating the one or more shared images that are used by the client computing device and one or more other client computing devices;
generating the one or more shared images based on the first one or more source files;
identifying a second one or more source files for generating the one or more dedicated images dedicated to the client computing device;
generating a configuration file that includes instructions for the client computing device to synthesize the one or more shared images and the second one or more source files to the requested image;
sending the one or more shared images, the second one or more source files, and the configuration file to the client computing device;
synthesizing, by the client computing device using operational information included with the configuration file, the one or more shared images and the second one or more source files to produce a synthesized image; and
presenting, on the client computing device, the synthesized image.

9. The non-transitory, computer-readable medium of claim 8, further comprising one or more instructions to:
generate, based on the requested image, textual information that indicates at least a portion of the second one or more source files for generating the one or more dedicated images dedicated to the client computing device; and
send the textual information and the third one or more source files to the client computing device.

10. The non-transitory, computer-readable medium of claim 8, further comprising one or more instructions to:
identify a third one or more source files for generating one or more dedicated images dedicated to the one or more other client computing devices;
generate, based on the requested image, textual information that indicates at least a portion of the second one or more source files and the third one or more source files for generating the one or more dedicated images dedicated to the client computing device; and
send the textual information and the third one or more source files to the client computing device.

11. The non-transitory, computer-readable medium of claim 10, wherein the first one or more source files, the second one or more source files, and the third one or more source files are identified based on a type of service the image is used for, and wherein the one or more shared image, the second one or more source files, and the third one or more source files are sent to the client computing device and the one or more other client computing devices as a file package related to the type of service.

12. The non-transitory, computer-readable medium of claim 8, further comprising one or more instructions to generate one or more shared images before receiving the request for the image.

13. The non-transitory, computer-readable medium of claim 8, wherein the configuration file includes at least one of positions, sizes, or rotation angles for the second one or more source files to be synthesized relative to the one or more shared images.

14. The non-transitory, computer-readable medium of claim 8, wherein the configuration file includes computer-readable instructions for calculating at least one of positions, sizes, or rotation angles for the second one or more source files to be synthesized relative to the one or more shared images.

15. A computer-implemented system, comprising:
one or more computers; and
one or more computer memory devices interoperably coupled with the one or more computers and having tangible, non-transitory, machine-readable media storing instructions that, when executed by the one or more computers, perform one or more operations comprising:
receiving a request for an image to be presented on a client computing device that is synthesized by one or more shared images and one or more dedicated images dedicated to the client computing device;
identifying a first one or more source files for generating the one or more shared images that are used by the client computing device and one or more other client computing devices;
generating the one or more shared images based on the first one or more source files;
identifying a second one or more source files for generating the one or more dedicated images dedicated to the client computing device;
generating a configuration file that includes instructions for the client computing device to synthesize the one or more shared images and the second one or more source files to the requested image;
sending the one or more shared images, the second one or more source files, and the configuration file to the client computing device;
synthesizing, by the client computing device using operational information included with the configuration file, the one or more shared images and the second one or more source files to produce a synthesized image; and
presenting, on the client computing device, the synthesized image.

16. The computer-implemented system of claim 15, further comprising one or more operations to:
generate, based on the requested image, textual information that indicates at least a portion of the second one or more source files for generating the one or more dedicated images dedicated to the client computing device; and
send the textual information and the third one or more source files to the client computing device.

17. The computer-implemented system of claim 15, further comprising one or more operations to:
identify a third one or more source files for generating one or more dedicated images dedicated to the one or more other client computing devices;
generate, based on the requested image, textual information that indicates at least a portion of the second one or more source files and the third one or more source files for generating the one or more dedicated images dedicated to the client computing device; and
send the textual information and the third one or more source files to the client computing device.

18. The computer-implemented system of claim 17, wherein the first one or more source files, the second one or more source files, and the third one or more source files are identified based on a type of service the image is used for, and wherein the one or more shared image, the second one or more source files, and the third one or more source files are sent to the client computing device and the one or more other client computing devices as a file package related to the type of service.

19. The computer-implemented system of claim 15, further comprising one or more operations to generate one or more shared images before receiving the request for the image.

20. The computer-implemented system of claim 15, wherein the configuration file includes at least one of positions, sizes, or rotation angles for the second one or more source files to be synthesized relative to the one or more shared images, or computer-readable instructions for calculating at least one of positions, sizes, or rotation angles for the second one or more source files to be synthesized relative to the one or more shared images.

\* \* \* \* \*